United States Patent [19]
Poncelet et al.

[11] Patent Number: 5,888,711
[45] Date of Patent: *Mar. 30, 1999

[54] POLYMERIC CONDUCTIVE ALUMINO-SILICATE MATERIAL, ELEMENT COMPRISING SAID MATERIAL, AND PROCESS FOR PREPARING IT

[75] Inventors: Olivier Jean Christian Poncelet; Jeannine Rigola, both of Chalon Sur Saone, France

[73] Assignee: Eastman Kodak Company, Rochester, N.Y.

[ * ] Notice: The term of this patent shall not extend beyond the expiration date of Pat. No. 5,714,309.

[21] Appl. No.: 666,516

[22] PCT Filed: Oct. 24, 1995

[86] PCT No.: PCT/EP95/04165

§ 371 Date: Jun. 27, 1996

§ 102(e) Date: Jun. 27, 1996

[87] PCT Pub. No.: WO96/13459

PCT Pub. Date: May 9, 1996

[30] Foreign Application Priority Data

Oct. 31, 1994 [FR] France ..................... 9413264

[51] Int. Cl.⁶ ..................................... G03C 1/89
[52] U.S. Cl. .......................... 430/527; 430/530; 430/631; 423/328.1; 252/519.32; 252/519.33; 252/521.3
[58] Field of Search ........................ 252/521.3, 519.33, 252/519.32; 430/527, 530, 631; 423/328.1; 428/319.1

[56] References Cited

U.S. PATENT DOCUMENTS

| | | | |
|---|---|---|---|
| 4,152,404 | 5/1979 | Farmer | 423/329 |
| 4,252,779 | 2/1981 | Farmer | 423/327 |
| 4,495,276 | 1/1985 | Takimoto et al. | 430/527 |
| 5,714,309 | 2/1998 | Poncelet et al. | 430/527 |

FOREIGN PATENT DOCUMENTS

| | | |
|---|---|---|
| 250154 | 12/1987 | European Pat. Off. . |
| 511764 | 11/1992 | European Pat. Off. . |
| 2385646 | 10/1978 | France . |
| 6/186672 | 7/1994 | Japan . |
| 2025384 | 1/1980 | United Kingdom . |
| 1574954 | 9/1980 | United Kingdom . |
| 2092768 | 8/1982 | United Kingdom . |

OTHER PUBLICATIONS

Chemical Abstracts, vol. 91, No. 22, Nov. 26, 1979, abstract no. 178284.

European Polymer Journal, col. 27, No. 7, (1991), Oxford GB, pp. 609–612, S. M. Barrett et al.

*Primary Examiner*—Thorl Chea
*Attorney, Agent, or Firm*—Andrew J. Anderson

[57] ABSTRACT

The present invention concerns a novel synthetic inorganic material based on aluminum and silicon, and a process for obtaining it. By controlled hydrolysis of a mixed aluminum-silicon alkoxide, or a mixed aluminum-silicon precursor, and hydrothermal treatment in presence of silanol, a material with a fibrous structure of formula $Al_xSi_yO_z$, where x:y is for example between 1.5 and 2.5 and z is between 2 and 6, is obtained.

Application to the production of antistatic materials.

18 Claims, 5 Drawing Sheets

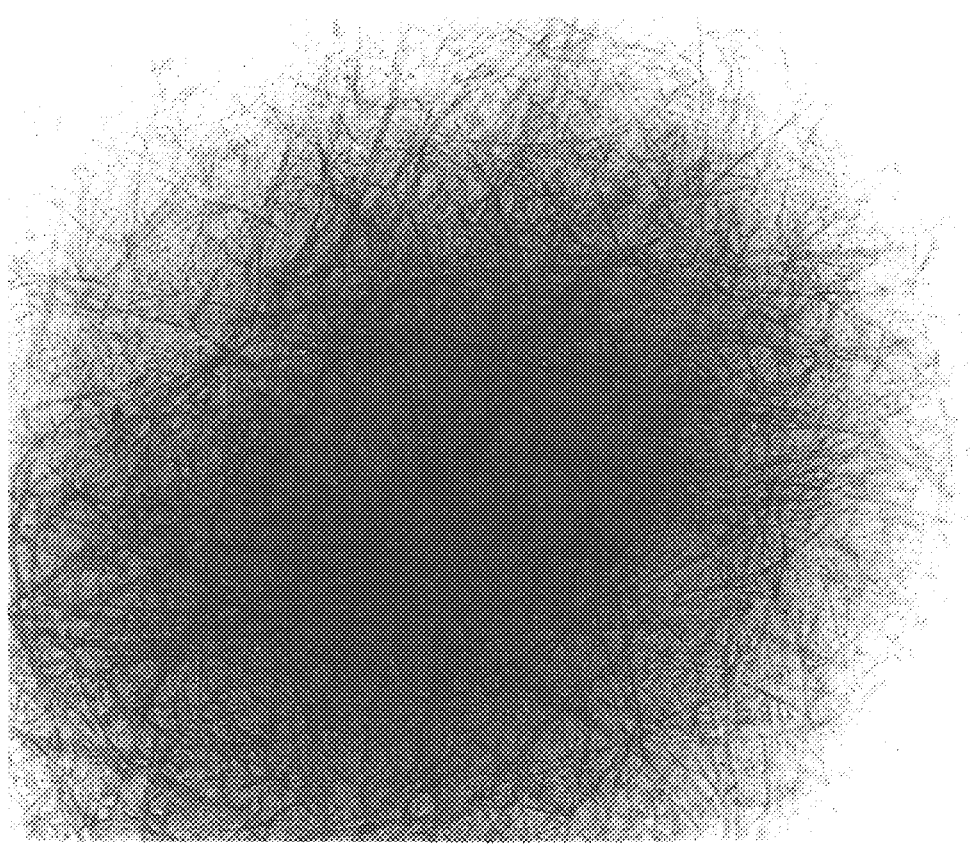
FIG. 1A  100 nm 75 nm

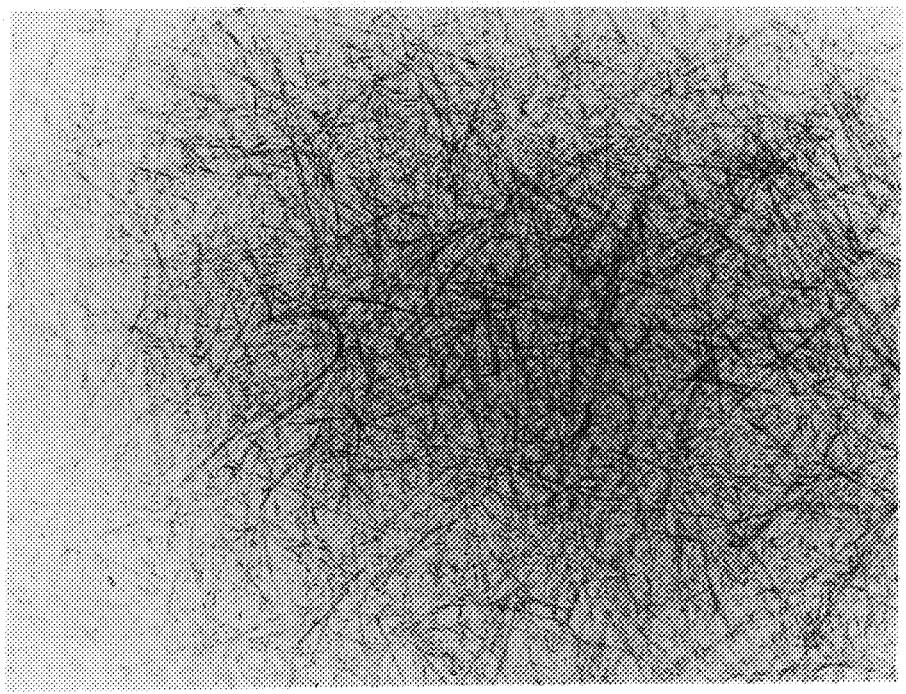
FIG. 2A    220 nm 300 nm

POLYMERIC CONDUCTIVE ALUMINO-SILICATE MATERIAL, ELEMENT COMPRISING SAID MATERIAL, AND PROCESS FOR PREPARING IT

The present invention concerns a novel polymeric conductive alumino-silicate and a process for preparing it. The present invention also concerns an element having thereon said new polymeric material.

Aluminosilicate in fiber form is known in the Art. A filamentous, tubular and crystallized aluminosilicate called Imogolite has been found in volcanic ashes and other soils. Farmer in U.S. Pat. No. 4,152,404 and 4,252,779 describes an inorganic material related to natural imogolite. This inorganic material is synthesized by reacting soluble silica or a soluble silicate compound with an aluminum compound to form a soluble hydroxyaluminum silicate complex in an aqueous solution at a pH of 3.2 to 5.5; and digesting at pH 3.1 to 5.0 soluble hydroxyaluminum complexes freshly formed, thereby forming a colloidal dispersion of the inorganic material. This inorganic material can be used as molecular sieve, catalyst support, coagulant or sorbent. By evaporating imogolite colloidal solutions onto a flat surface, coherent films can be formed and used as membranes. When the product is not isolated from its colloidal solution, it may be used as a flocculant, a hydrophilizer or a thickener.

Aluminum silicon metal oxide particles have been described in a large number of patents. Theses particles are crystallized electrically conductive particles which are used dispersed in a binder as antistatic material. For example, a composite oxide from aluminum and silicon has been described in U.S. Pat. No. 4,495,276. In this patent, the crystalline metal oxide particles are used as an antistatic layer in a photographic element.

EP 250,154 describes a photographic element comprising a polymeric surface to which is adhered a layer comprising a gelled network of inorganic particles, preferably inorganic oxide particles. According to that patent, the gelled network is a porous coating having voids between the inorganic oxide particles. The porous coating is obtained from a dispersion or suspension of finely divided particles in a liquid medium. Inorganic oxide particles can be boehmite (aluminum oxide), silica or alumina-coated silica. The "gelled network" is formed by an aggregation of colloidal particles linked together to form a porous three-dimensional network. The gelled network provides a subbing layer having antistatic properties.

An object of the present invention is to provide a new homogeneous polymeric alumino-silicate material having antistatic properties. An other object of the present invention is to provide a new process to obtain this polymeric material. A third object of the present invention is to provide an element comprising an antistatic layer consisting of the polymeric material of the present invention.

In accordance with the invention, there is provided a process to obtain the polymeric alumino-silicate according to the invention which comprises the following steps:
(a) treating a mixed aluminum-silicon alkoxide, or a mixed aluminum-silicon precursor, with an aqueous alkali, whilst maintaining the pH at a value between 4 and 6.5; the Al molar concentration being maintained in the range of $5 \times 10^{-4}$ to $10^{-2}$, and the Al/Si molar ratio between 1 and 3;
(b) heating the mixture obtained in step (a) at a temperature below 100° C., and in the presence of silanol groups, for a period sufficient to have a complete reaction whereby a polymeric material is obtained; and
(c) eliminating the residual ions from the reaction medium.

The material thus obtained is a polymeric fibrous alumino-silicate which can be directly applied onto a support in order to unexpectedly form an antistatic layer.

An other object of the present invention is a polymeric inorganic material comprising more than 80 moles % of a fibrous alumino-silicate of formula $Al_xSi_yO_z$, wherein the ratio x:y is between 1 and 3, preferably between 1.5 and 2.5; z is between 1 and 10, preferably between 2 and 6. According to one embodiment, the polymeric material comprises more than 98 moles % of a fibrous alumino-silicate having the above formula. This new polymeric material has properties which make it possible to envisage its use for producing in particular antistatic coatings or permeable membranes.

In accordance with the invention, it is also provided an element comprising a support having thereon an antistatic layer comprised of a polymeric inorganic material based on silicon and aluminum comprising more than 80 moles % of a fibrous alumino-silicate of formula $Al_xSi_yO_z$ in which the ratio x:y is between 1 and 3, and z is between 2 and 6.

By the present invention, it is further provided a photographic element comprising a support having thereon at least one silver halide emulsion and an antistatic layer obtained by coating on the support the material obtained after eliminating the residual ions.

The novel polymeric electroconductive alumino-silicate has a fractal morphology demonstrated by transmission electron microscopy, a homogenous fibrous structure demonstrated by electron diffraction and a composition characterized by a homogenous Al/Si molar ratio demonstrated by X-ray microanalysis (using an energy dispersive X-ray spectrometer).

FIG. 1A is a transmission electron photomicrograph of the material of the present invention.

FIG. 2A is a transmission electron photomicrograph of the material of the present invention.

Figure 3:
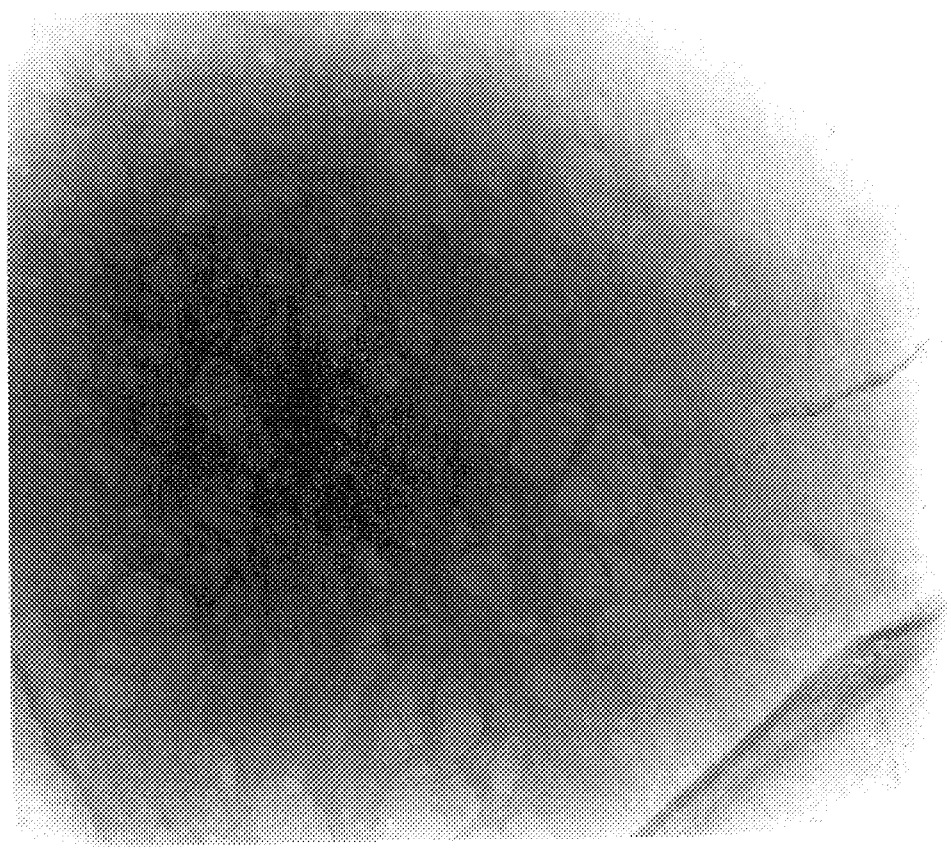

FIG. 3 is a transmission electron photomicrograph of the material obtained from the Farmer's process disclosed in U.S. Pat. No. 4,252,779.

An embodiment of the above process consists of forming in situ a mixed aluminum and silicon precursor by reacting an aluminum salt and a silicon alkoxide. The aluminum salt may be a halide, for example a chloride or bromide, a perhalogenate (for example perchlorate), a sulphate or a nitrate, a phosphate or an aluminum salt of an organic acid. Preferably, a halide or a perhalogenate is used. The silicon alkoxide can be a methoxide or an ethoxide, or a corresponding chloroalkoxide. The hydrolysis of the aluminum salt and the silicon alkoxide is effected in a controlled manner, in order to form the mixed aluminum and silicon precursor which can then be used in step (a) defined above.

The controlled hydrolysis is carried out by slowly adding the silicon alkoxide to an aqueous solution of the freshly prepared aluminum salt. In practice, the silicon alkoxide, either pure or diluted in an alcohol solution, is added dropwise to an aqueous solution of aluminum chloride, aluminum perchlorate, etc. The addition is effected at room temperature, with stirring, the aluminum solution having a concentration of between $5 \times 10^{-4}$M and $10^{-2}$M and advantageously between $5 \times 10^{-3}$M and $7 \times 10^{-3}$M. This technique is known as the sol/gel method, described for example in French patent application 9203653 or in U.S. Pat. No. 4,122,041. This controlled hydrolysis can also be carried out using the so-called "inverted micelles" technique, described in European patent EP 332,686.

A mixed aluminum-silicon precursor can also be formed by mixing a silicon alkoxide or chloroalkoxide with an aluminum alkoxide or chloroalkoxide, for example an alkoxide group having from 1 to 5 carbon atoms such as a methoxide, a propoxide or isopropoxide, or a butoxide, and then hydrolyzing this mixture, as described above.

The process according to the invention comprises a first step (a) which consists of treating either the mixed aluminum-silicon alkoxide or the mixed aluminum-silicon precursor by means of an alkali in aqueous or hydroalcoholic solution. Step (a) should be carried out whilst maintaining the pH between 4 and 6.5 and preferably between 4.5 and 5.5; the optimum pH depending on the starting compounds used. If the pH is below 4, the action of the alkali results in the non-reversible formation of hydrated alumina, whilst at a pH above 6.5 there is the non-reversible formation of a silica gel.

The alkali is preferably an aqueous solution of sodium or potassium hydroxide, at a concentration of between 2M and $10^{-2}$M, preferably between 1M and $10^{-2}$M. The alkali solution is added to the mixed aluminum-silicon alkoxide or to the mixed aluminum-silicon precursor at a rate of between 0.1 and 100 mmoles/hour and advantageously between 1 and 10 mmoles/hour. The total quantity of alkali added represents, in moles, between 2 and 3 times and preferably between 2.3 and 2.5 times the amount of aluminum.

In a second step (b), the process according to the invention consists of heating the mixture resulting from the previous step (a) under predetermined temperature conditions, in the presence of silanol groups, until a complete condensation reaction is achieved. By "condensation reaction, it is meant "a reaction whereby the alkoxide molecules are co-condensed with elimination of $H_2O$". The condensation reaction is considered to be completed when the reacting medium contains no ions other than those coming from the alkali, that is to say $Na^+$ or $K^+$ ions; all the other ions, that is to say those of the silicon and aluminum, having been used to form a polymeric alumino-silicate.

Alternatively, the mixture resulting from step (a) can be concentrated, submitted to a treatment such as centrifugation to isolate a gel and diluted again before heating step (b). Such a procedure is illustrated by example 1 herein below.

According to one embodiment, step (b) is carried out at a temperature in the range of from about 70° to 98° C.

An important characteristic of the invention is that this heating step is carried out in the presence of silanol groups.

The tests carried out within the framework of the present invention show particularly that the condensation reaction in the above step (b) produces an inorganic polymeric aluminosilicate with a homogeneous fibrous structure, provided that the reaction is carried out in the presence of silanol groups. For example, the silanol groups can be introduced by means of a substrate having an amount of accessible silanol (SiOH) groups, that is to say located on the surface of the substrate, which is at least approximately 4 silanol groups per $\mu m^2$ of surface area of substrate, which corresponds to a ratio between the number of Al atoms engaged in the reaction to the number of silanol groups of less than approximately $2.25 \times 10^{10}$ and advantageously less than $1.0 \times 10^{10}$.

If the process is carried out in a glass reactor, the silanol groups are provided by the internal wall of the reactor itself as Example 1.

Preferably, the substrate comprising superficial SiOH silanol groups is in a divided form. An appropriate implementation of the process of the invention comprises carrying out step (b) in an inert reactor, this is to say one with no silanol radical on its internal surface and/or not including any ancillary device such as a stirrer or probe with such silanol groups, and adding the desired amount of silanol groups to the reaction medium. In this way, it is possible to control this step of the process. The inert reactor is for example a reactor made from stainless steel or a polymeric material such as polytetrafluoroethylene; it is possible to introduce the appropriate substrate with silanol groups, for example using various plates pre-treated in order to graft onto the surface the desired quantity of accessible silanol groups, and then immersed in the reaction medium. The number of SiOH equivalents required for carrying out the reaction in order to obtain the intended product was determined in accordance with the information provided by B. Arkles in Silicon Compounds; Register and Review, Petrarch Systems Silanes & Silicones, 1987, ABCR GmbH & Co, Karlsruhe, page 54.

During the heating step (b), the Al molar concentration is in the range of from $5 \times 10^{-4}$ to $10^{-2}$M, and preferably $2.5 \times 10^{-3}$ to $9 \times 10^{-3}$M. During the heating step (b), the pH value is preferably in the range from 4 to 5, but can be varied depending on the selection of the starting reactants.

Step (c) of the present invention comprises in eliminating the residual ions which are present in the reaction medium at the end of step (b). The ions designated as residual ions are essentially the ions from the alkali used in step (a). The elimination of the residual ions can be carried out for example by dialysis or by ultra-filtration.

The Al:Si molar ratio, calculated with regard to the starting products, is between 1 and 3 and preferably between 1.5 and 2.5. In the final material, the Al:Si molar ratio is substantially the same.

The polymeric material resulting from step (c) can be isolated from its solution by lyophilisation, or it can be concentrated by gelling and centrifugation. In the isolated form, the material can be used as a membrane or molecular sieve, for filtration applications. The gel can be applied directly onto a support or the colloidal solutions of the polymeric alumino-silicate can also be evaporated in order to produce deposits on various surfaces. The coatings obtained have antistatic properties which are stable over time.

FIG. 1A shows an example of a view obtained by transmission electron photomicrograph. This figure shows the morphology of the material. This morphology is observed at increasing definitions/magnifications which enables it to be classified as fractal. This morphology and fibrous structure are also observed whatever the location of the examination: this structure is the same at any point on the material (magnification: 100,000).

Figure 1B:
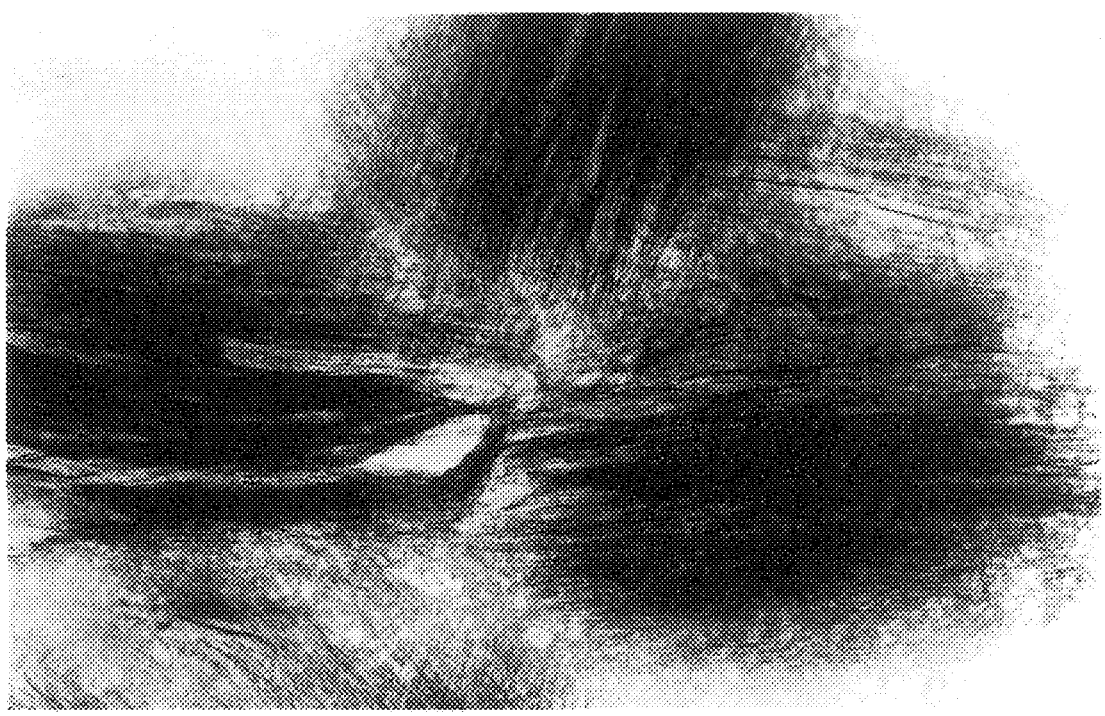
FIG. 1B is a transmission electron photomicrograph of a comparative material.

FIG. 1B shows an example of a transmission electron photomicrograph obtained with a comparative material. The heterogeneity of the structure can be seen.

FIG. 2A shows an example of a transmission electron photomicrograph obtained with a sample of the material according to the invention, with a higher magnification than for FIG. 1A.

Figure 2B:
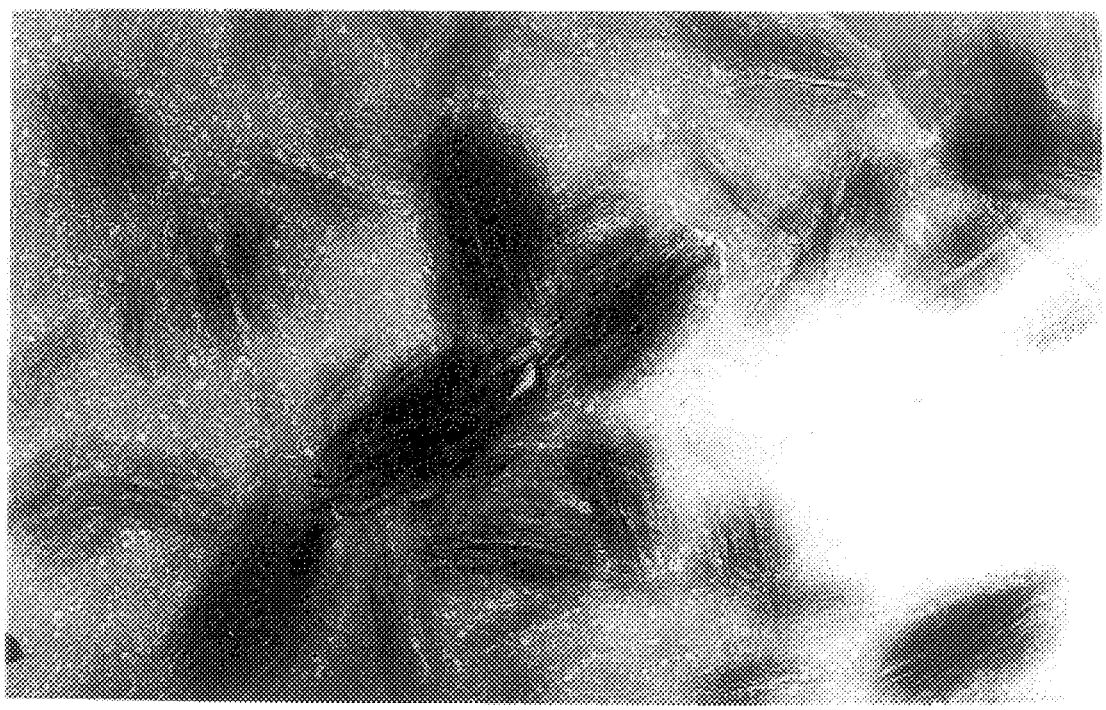
FIG. 2B is a transmission electron micrograph of the comparative material.

FIG. 2B shows an example of a transmission electron photomicrograph obtained with a comparative sample, with a greater magnification than for FIG. 1B.

FIG. 3 is a transmission electron photomicrograph obtained with the Farmer's material prepared according to the process of example 4. This figure clearly shows that the obtained material presents a heterogeneous structure.

The process according to the invention makes it possible to obtain, directly and without any purification operation, a synthetic inorganic material based on aluminum and silicon, characterized in that it consists, for more than 80 moles A, and advantageously more than 90 moles % and, even more advantageously, more than 98 moles %, of a fibrous alumino-silicate of formula $Al_xSi_yO_z$, where x, y and z have the meanings given above. The present material is unexpectedly homogeneous.

When the operating conditions of the process according to the invention are not used, a heterogeneous product is obtained, comprising up to 60% molar alumina (boehmite) in the form of aggregates. Such a product, for which the characterization views are given in FIGS. 1B and 2B does not make it possible to obtain stable gels and consequently does not lend itself to the production of either antistatic or materials for filtration. Furthermore, the conductivity of the material of the present invention is particularly stable with time.

The following examples illustrate the invention.

EXAMPLE 1

16.7 mmoles of tetraethylorthosilicate, $Si(OEt)_4$, was added to 1000 ml of deionized water. The reaction mixture was stirred at room temperature for 1 hour, and then this solution was added to a solution of 31.2 mmoles of aluminum chloride hexahydrate $AlCl_3,6H_2O$ in 1000 ml of pure water.

The mixture was stirred vigorously for 20 minutes, and then a NaOH,1M solution was added to the colorless solution until a pH of 4.5 was obtained. A cloudy solution was obtained, which was stirred overnight.

The pH was adjusted to 6.8 with NaOH,1M. A white gel was obtained which is centrifuged for 20 minutes at 2000 rpm. A white gel was collected which was solubilized with 5 ml of a 50:50 mixture of hydrochloric acid 1M and acetic acid 2M. The volume of the solution was made up to 1 liter with water. The solution contains 30 mmoles of aluminum, 16.6 mmoles of silicon, 5 mmoles hydrochloric acid and 10 mmoles acetic acid. This solution, as referred as the mother liquor was kept at 50° C. for subsequent use.

250 ml of the mother liquor obtained above were diluted in 550 ml of deionized water and the mixture was heated at a temperature of between 95° and 100° C. for 2 hours in a 20 cm diameter glass spherical reactor. The quantity of SiOH groups on the surface of the internal wall of the reactor, in contact with the reaction medium, was estimated not less than $4 \times 10^{11}$.

The heating step was carried out as follows: every two days, 250 ml of the mother solution was added to the solution heated in the presence of silanol groups. After 120 hours of heat treatment, the solution was cooled down at room temperature. At this solution, an ammonia solution $NH_4OH$, 1M was added slowly to adjust the pH to 8.0. A gel was obtained. The gel obtained was centrifuged for 15 minutes at 2000 rpm and the supernatant solution was removed.

The remaining gel was solubilized by the addition of a few drops of hydrochloric acid 12N, and then dialysis was carried out with deionized water for four days. A thixotropic gel was obtained.

This gel, by lyophilisation, provided a cotton-like fibrous material, which can be stored without deterioration for an indefinite period.

A solution of 10 g of the above gel was used. An Estar® polyester support was coated with this gel in order to obtain approximately 30 mg of inorganic polymer per $m^2$. This layer has a resistivity of $10^8$ ohms/square at 25% RH, 22° C., stable over time which makes it possible to envisage its use as an antistatic material.

EXAMPLE 2

In a 20 cm diameter spherical reactor made from inert plastic (polytetrafluoroethylene), 2.4 g (10 mmoles) of $AlCl_3,6H_2O$, purity 99%, sold by the Company Aldrich, were mixed with 2000 ml of deionized water.

1.05 g (5 mmoles) of $Si(OEt)_4$, purity 99%, sold by the Company Ventron, was added using a syringe and with vigorous stirring. The mixture was left to stand for 20 minutes. The Al/Si molar ratio was 2.

220 ml of NaOH, 0.1M were added slowly whilst stirring. The mixture was left to stand for 2 hours. The pH was then 4.35 at 25° C.

A first sample A of 900 g of this solution was introduced into an inert plastic flask containing 50 g of glass chips (Raschig rings), and a second sample B of 1000 g of the same solution, was introduced into an identical flask but without adding the glass chips.

The two samples A and B were heated in an oven at 98° C. for 5 days.

The two samples were then gelled by the addition of ammonia solution and then centrifuged in order to separate the gel from supernatant.

The following were recovered:

318.78 g of gel with sample A 370.75 g of gel with sample B.

Each gel was separately redispersed in HCl,12N, and then dialyzed in 17.2 l of deionized water. 310.08 g of gel was recovered with sample A (31%) and 304.02 g with sample B (40%). Samples A and B were examined by transmission electron microscopy. FIG. 1B shows clearly a heterogeneous structure with particles, whilst FIG. 1A (sample A according to the invention, prepared in the presence of silanol) shows an uniform fibrous structure. FIGS. 2A and 2B show respectively the same materials under greater magnification, which confirm the observations made with regard to FIGS. 1A and 1B.

The samples A (invention) and B (comparison) were analyzed by EDXRMA (energy Dispersive X ray Micro Analyser).

The Sample B spectrum shows a high Aluminium to silicon peak height ratio corresponding to a molar ratio greater than 4. This ratio is consistent with the boehmite structure dominating the reaction products and absorption of silica species. Analyses performed using a nanoprobe on various areas gives a wide range of Al/Si ratios reflecting variations of the amount of adsorbed silica species.

The sample A spectrum shows a corresponding Al/Si peak height ratio estimated to 1.60 to 1.80 which is in a good agreement with the Al/Si molar optimum ratio found for the formation of Imogolite. This apparent concentration has been obtained with various probe sizes (2.5 $\mu$m to 2 nm) illustrating the remarkable chemical homogeneity of this material.

The samples A (invention) and B (comparison) were also analyzed by Electron Diffraction. From Sample A, a highly ordered pattern typical of fibrous structure was obtained whereas the pattern obtained from sample B corresponds to a non fibrous structure.

EXAMPLE 3

The procedure of example 1 was repeated except that, for the heating step all the mother liquor was used in a single batch. Then, after the heating step was completed, the resulting product was filtered through an ultra filtration membrane having a molecular weight cut-off of 20,000 manufactured by Osmonics® corp., with a flow rate of 550 ml/min. A clear and high viscosity solution was obtained having an Al/Si ratio of 1.8.

EXAMPLE 4

Reproduction of the process as described in U.S. Pat. No. 4,252,779

25.8 $10^{-3}$ mol. of $Na_2SiO_3$, $5H_2O$ was dissolved in 1614 $cm^3$ of deionized water and 53 $cm^3$ of $Na_2CO_3$, 1M in order to obtained a first solution.

50 mmol. of $Al(NO_3)_3$, $9H_2O$ was mixed with 291 $cm^3$ of deionized $H_2O$ and 42 $cm^3$ of $HClO_4$, 1M in order to obtain the second solution.

After mixing the first and the second solution, pH was adjusted at 4.5 with NaOH, 1M. When the solution was clear, pH was adjusted at 6.8 with NaOH, 1M. A precipitate was obtained which was recovered by centrifugation (3000 rpm). The recovered precipitate was solubilized with 15 $cm^3$ of a solution containing HCl, 1M and $CH_3COOH$, 2M. The volume was adjusted at 1000 $cm^3$ with water.

200 $cm^3$ of the obtained solution were diluted with 800 $cm^3$ of deionized water in order to obtain a Al molar concentration 10 mmol/l. The diluted solution was maintained at 96° C. for 5 days, in a plastic flask. At room temperature, the pH was adjusted at 8,00 by introduction of $NH_4OH$. 456.83 g of gel were recovered after centrifugation at 3000 rpm for 30 min. The gel was solubilized with HCl, 12N, and dialized with deionized water. The gel thus obtained was analyzed according to the method disclosed above.

The EDXRMA spectrum of this material is identical to the spectrum of sample A (Imogolite structure), however the transmission electron photomicrograph (FIG. 4) shows that the obtained material presents a heterogeneous structure.

EXAMPLE 5

In Example 5.1, the gel of Example 1 obtained after elimination of the residual ions (invention) was coated on a support. In example 5.2, the gel of Example 4 was coated on a support. The resistivity of both layers thus obtained was measured immediately after the coating, after 6 days, and after 1 month.

The results are summarized in following Table 1.

TABLE 1

| | Resistivity (Ω/square) 20% RH, T = 22° C. | | | Coverage |
| --- | --- | --- | --- | --- |
| | Fresh layer | After 6 days | After 1 month | (Al + Si) (mg/m$^2$) |
| Ex. 5.1 (INV) | 7 × 10$^7$ | 1 × 10$^8$ | 1 × 10$^8$ | 30 |
| Ex. 5.2 (comp.) | 2.45 × 10$^7$ | 3 × 10$^9$ | >10$^{12}$ | 30 |

It is clear from these results that the antistatic properties of the layer of the present invention, e.i., a layer consisting essentially of fibrous alumino-silicate of the present invention are stable with time. The high resistivity of the fresh layer of Example 5.2 is not due to the material itself but it is due to the presence of water into the coated material. This is not the case with the material of the present invention.

EXAMPLE 6

6.1—The material obtained in example 1 after elimination of the residual ions was coated as antistatic layer (30 mg/m$^2$ based on Al+Si) on one side of a support, the support having on the other side a silver halide emulsion layer and an overcoat. The resistivity of the photographic element was 7×10$^7$ Ω/square. This resistivity was stable with time.

The sensitometric results obtained with and without the antistatic layer show that the presence of the antistatic layer does not modify the sensitometric properties of the photographic element.

6.2—The same antistatic layer was coated on the overcoat of the photographic element as above described. The resistivity of the photographic element was about 10$^9$ Ω/square. This resistivity was stable with time.

As in the previous case, no modification of the sensitometric properties was noticed.

In all the examples, the electron photomicrographs were produced with a Philips CM12-STEM microscope, used in transmission mode. The microscope was calibrated with a grid of 2160 lines/mm in the magnification range ×30,000–× 160,000. Examination of the samples was carried out at a voltage of 120 kV. The X-ray diffraction spectra were produced with an EDAX Micro Analyzer connected to the CM12 microscope. The calibration was carried out with samples of silica and kaolin.

We claim:

1. A process for preparing a polymeric inorganic conductive material based on aluminum and silicon, comprising the following steps:
   (a) treating a mixed aluminum-silicon alkoxide, or a mixed aluminum-silicon precursor, by addition of an aqueous alkali, whilst maintaining the pH at a value between 4 and 6.5; the Al molar concentration being maintained in the range of 5×10$^{-4}$ to 10$^{-2}$, and the Al/Si molar ratio between 1 and 3;
   (b) heating the treated mixed aluminum-silicon alkoxide or mixed aluminum-silicon precursor obtained from step (a) at a temperature below the boiling point of water, in the presence of silanol groups, for a period sufficient to have a complete reaction whereby a polymeric inorganic conductive material is obtained; and
   (c) separating residual ions present after step (b) from the polymeric inorganic conductive material.

2. The process of claim 1, wherein, in step (b), the amount of silanol groups corresponds to a ratio between aluminum atoms and silanol groups of less than 2.25×10$^{10}$.

3. The process of claim 1, wherein, in step (b), the amount of silanol groups corresponds to a ratio between aluminum atoms and silanol groups of less than 1.0×10$^{10}$.

4. The process of claim 1 wherein the Al/Si molar ratio is between 1.5 to 2.5.

5. The process of claim 1, wherein, in step (b), said heating is at a temperature in the range from about 70° to 98° C.

6. The process of claim 1, wherein, said alkali is selected from the group consisting of sodium and potassium hydroxide.

7. The process of claim 6, wherein said alkali is added at a rate of 0.1 to 100 mmoles per hour.

8. The process of claim 7, wherein said alkali is added at a rate of 1 to 10 mmoles per hour.

9. The process of claim 1 wherein in step (a), the pH is maintained at between 4.5 and 5.5.

10. The process of claim 1, wherein said mixed precursor compound of aluminum and silicon is the product of the hydrolysis of (i) a compound selected from the group consisting of an aluminum salt, an aluminum alkoxide and an aluminum halogenoalkoxide and (ii) a silicon alkoxide or silicon chloroalkoxide.

11. The process of claim 10, wherein the mixed precursor compound of aluminum and silicon is the product of the hydrolysis of an aluminum salt or an aluminum alkoxide or halogenoalkoxide and a silicon alkoxide.

12. The process of claim 11, wherein said aluminum salt is selected from the group consisting of a nitrate, a phosphate, a sulphate and the aluminum salt of an organic acid.

13. The process of claim 11, wherein said silicon alkoxide is an ethoxide or a methoxide.

14. The process of claim 1 wherein, the mixed aluminum-silicon precursor as obtained by slowly introducing a silicon alkoxide into a freshly prepared aluminum salt aqueous solution.

15. A polymeric inorganic material based on silicon and aluminum comprising more than 80 moles % of a fibrous alumino-silicate of formula $Al_xSi_yO_z$ in which the ratio x:y is between 1 and 3, and z is between 2 and 6.

16. A polymeric inorganic material according to claim 15 comprising more than 98 mol. % of a fibrous alumino-silicate.

17. An element comprising a support having thereon a conductive layer consisting of a polymeric inorganic material based on silicon and aluminum comprising more than 80 moles % of a fibrous alumino-silicate of formula $Al_xSi_yO_z$ in which the ratio x:y is between 1 and 3, and z is between 2 and 6.

18. A photographic element comprising a support having thereon at least one silver halide emulsion and a antistatic layer obtained by coating on the support the material obtained by the process of claims 1.

* * * * *